US006451717B1

(12) United States Patent
Fitzgerald et al.

(10) Patent No.: US 6,451,717 B1
(45) Date of Patent: Sep. 17, 2002

(54) HIGHLY DURABLE OIL/WATER REPELLENTS FOR TEXTILES

(75) Inventors: John J. Fitzgerald, Boothwyn, PA (US); Melissa Ann Sherman, Centerville, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/460,485

(22) Filed: Dec. 14, 1999

(51) Int. Cl.$^7$ .............................. B32B 25/10; B05D 5/08
(52) U.S. Cl. .................. 442/82; 524/805; 524/198; 524/195; 524/201; 428/392; 428/394; 428/393; 428/395; 428/421; 427/389.9; 427/392; 106/2; 442/152; 442/154; 442/164; 442/168; 442/169; 442/170; 525/326.2
(58) Field of Search ................. 524/805, 198, 524/195, 201; 428/392, 394, 393, 395, 421; 427/389.9, 392; 106/2; 442/152, 154, 164, 168, 169, 170, 82; 525/326.2

(56) References Cited

U.S. PATENT DOCUMENTS

| | | | |
|---|---|---|---|
| 3,944,527 A | 3/1976 | McCown | 260/79.7 |
| 3,995,085 A | 11/1976 | McCown | 428/262 |
| 4,013,627 A | 3/1977 | Temple | 526/245 |
| 4,478,975 A | 10/1984 | Dessaint et al. | |
| 4,834,764 A | 5/1989 | Deiner et al. | |
| 5,055,538 A | 10/1991 | Animote et al. | 526/245 |
| 5,136,000 A | 8/1992 | Luttenberger et al. | |
| 5,240,990 A | 8/1993 | Kallfass et al. | 524/714 |
| 5,376,441 A | 12/1994 | Wu et al. | 428/304.4 |
| 5,385,694 A | 1/1995 | Wu et al. | 252/312 |
| 5,387,640 A | 2/1995 | Michels et al. | 524/544 |
| 5,539,047 A | 7/1996 | Wu et al. | 524/805 |
| 5,578,688 A | 11/1996 | Ito et al. | 526/245 |
| 5,639,820 A | 6/1997 | Kubo et al. | 524/758 |
| 5,674,961 A | 10/1997 | Fitzgerald | 526/273 |
| 5,919,527 A | 7/1999 | Fitzgerald et al. | 427/389.7 |
| 6,309,752 B1 * | 10/2001 | Dams et al. | |

FOREIGN PATENT DOCUMENTS

| | | | | |
|---|---|---|---|---|
| DE | 41 13 893 A1 | 10/1992 | | C08F/220/24 |
| EP | 0473148 A1 | 3/1992 | | |
| FR | 2540131 | 8/1984 | | |
| JP | 63054410 A | 3/1988 | | |
| JP | 03008873 A | 1/1991 | | |
| JP | 04 053842 | 2/1992 | | |
| JP | 04080217 A | 3/1992 | | |
| JP | 6-240239 | * | 8/1994 | C09K/3/18 |
| JP | 09241573 A | 9/1997 | | |

* cited by examiner

Primary Examiner—Robert Dawson
Assistant Examiner—Kuo-Liang Peng

(57) ABSTRACT

The present invention comprises an aqueous emulsion for imparting oil and water repellency to textiles prepared by polymerizing a mixture of monomers (a), (b) and (c) as follows:

(a) 70–90% polymer chain units derived from a mixture of monomers of the formula:

$$R_f\text{—}Q\text{—}A\text{—}C(O)\text{—}C(R)\text{=}CH_2$$

wherein $R_f$ is a straight or branched-chain perfluoroalkyl group containing from 2 to about 20 carbon atoms; R is H or $CH_3$; A is O, S, or N(R'); Q is alkylene of 1 to 15 carbon atoms, hydroxyalkylene of 3 to 15 carbon atoms, —$(C_nH_{2n})(OC_qH_{2q})_m$—, —$SO_2$—NR'$(C_nH_{2n})$—, or —$CONR'(C_nH_{2n})$—, wherein R' is H or alkyl of 1 to about 4 carbon atoms, n is 1 to about 15, q is 2 to about 4, and m is 1 to about 15;

(b) 5–25% monomer chain units derived from a long-chain alkyl (meth)acrylate of the formula:

$$R''\text{—}O\text{—}C(O)\text{—}C(R)\text{=}CH_2$$

wherein R" is an alkyl group of about 12 to about 24 carbons and R is H or $CH_3$;

(c) 0.1–2.5% monomer chain units derived from compounds of the formulas:

$$HO\text{—}CH_2\text{—}CH_2\text{—}O\text{—}C(O)\text{—}C(R)\text{=}CH_2$$

or $$HO\text{—}CH_2\text{—}N(H)\text{—}C(O)\text{—}C(R)\text{=}CH_2,$$

wherein R is H or $CH_3$;

followed by adding an aromatic blocked isocyanate, and then adding the mixed fluoropolymer-isocyanate solution to water to create an aqueous dispersion.

12 Claims, No Drawings

HIGHLY DURABLE OIL/WATER REPELLENTS FOR TEXTILES

FIELD OF THE INVENTION

This invention relates to a composition and process for preparing an aqueous emulsion composition of a fluorochemical copolymer for imparting oil and water repellency to textiles, particularly to cotton or cotton blends, wherein the resulting textile has effective and highly durable initial and post-washing oil and water repellency.

BACKGROUND OF THE INVENTION

For many years the public has been accustomed to purchasing fabrics or garments prepared from natural cellulosic fibers such as cotton or its blends to which various sizing, repellency-enhancing and/or softening additives have been added to provide improved characteristics. However, these additives may also add undesirable characteristics to the fibers. As a result, it has become the practice to add one or more complementary materials which compensate for the imperfections of the various additives.

For example, crease-resistant resins added to fabrics consisting wholly or partially of cellulosic fibers provide enhanced appearance and minimize ironing, but at the same time the fabric is found to be more receptive to stains, particularly to oily stains. Release of these stains during cleaning, especially laundering, is found to be extremely difficult. This tendency can be alleviated by supplementing the fabric finish with a polymer containing fluoroaliphatic radicals. This confers a high degree of oil and water repellency to the fabric, and reduces the tendency to accept stains. A further improvement can be made by adding to the fluoropolymer an ingredient containing a hydroxyl group or other hydrophilic group to aid in releasing soil during laundering.

A fabric treated with resins also may have a harsher feel. Fabric softness can be improved by adding to the fluoropolymer an ingredient containing fatty alkyl groups.

The prior art discloses numerous specific polymers intended for application to textiles to bestow oil and water repellency properties. Such polymers are generally made from monomers which contain pendant perfluoroalkyl groups of three or more carbon atoms which provide the desired repellencies. These monomers are then generally copolymerized with other monomers to confer additional favorable properties to the textile fabrics. These polymers are generally marketed as aqueous emulsions for easy application to the fabric. The fabric-treating composition may also include other additives in addition to those copolymerized with the fluoropolymer. In particular, various compounds such as blocked isocyanates are frequently added after polymerization to promote durability of a desired property such as repellency. In such applications, the blocking agent is removed from the isocyanate under the thermal conditions used when curing the treated fabric, allowing the isocyanate group to interact with the fabric and improve the desired durability.

In one class of such compounds found to be useful for treating cotton or cotton blends, the perfluoroalkyl groups are connected to polyurethane groups as monomers. However, such urethanes and their isocyanate intermediates are costly and potentially hazardous to manufacture.

In a second class of fluoropolymers useful for treating cotton and cotton blends, the perfluoroalkyl groups are connected to (meth)acrylate groups. By "(meth)acrylate" is meant methacrylate, acrylate, or a combination of these groups. These fluoropolymers can be copolymerized with other monomers, such as non-fluorine-containing (meth) acrylate compounds containing a long-chain fatty alkyl group and/or a hydrophilic group. These products have the advantage that they do not involve costly and potentially hazardous isocyanate/urethane chemical manufacturing steps (except indirectly, for any blocked isocyanates added).

A fluorochemical copolymer composition for imparting oil and water repellency to fabrics which is more effective than existing urethane or (meth)acrylate fluoropolymers would have widespread applications, in particular wherein the resulting textile has effective and highly durable initial and post-washing oil and water repellency. The present invention provides such fluorochemical copolymer compositions.

SUMMARY OF THE INVENTION

The present invention comprises an oil- and water-repellent aqueous emulsion prepared by:

1) forming a monomer mixture comprising by weight:
   (a) 70–90% polymer chain units derived from a mixture of monomers of the formula:

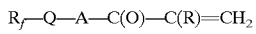
   $$R_f\text{—}Q\text{—}A\text{—}C(O)\text{—}C(R)\text{=}CH_2$$

wherein
   $R_f$ is a straight or branched-chain perfluoroalkyl group containing from 2 to about 20 carbon atoms,
   R is H or $CH_3$,
   A is O, S, or N(R'),
   Q is alkylene of 1 to 15 carbon atoms, hydroxyalkylene of 3 to 15 carbon atoms, $\text{—}(C_nH_{2n})(OC_qH_{2q})_m\text{—}$, $\text{—}SO_2\text{—}NR'(C_nH_{2n})\text{—}$, or $\text{—}CONR'(C_nH_{2n})\text{—}$, wherein R' is H or alkyl of 1 to about 4 carbon atoms, n is 1 to about 15, q is 2 to about 4, and m is 1 to about 15;
   (b) 5–25% monomer chain units derived from a long-chain alkyl (meth)acrylate of the formula:

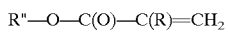
   $$R''\text{—}O\text{—}C(O)\text{—}C(R)\text{=}CH_2$$

wherein R" is an alkyl group of about 12 to about 24 carbons and R is H or $CH_3$;
   (c) 0.1–2.5% monomer chain units derived from compounds of the formulas:

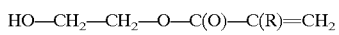
   $$HO\text{—}CH_2\text{—}CH_2\text{—}O\text{—}C(O)\text{—}C(R)\text{=}CH_2$$

or

   $$HO\text{—}CH_2\text{—}N(H)\text{—}C(O)\text{—}C(R)\text{=}CH_2,$$

wherein R is H or $CH_3$;
2) polymerizing the mixture of monomers (a), (b) and (c) in an organic solvent using a free radical initiator as catalyst;
3) adding, in an organic solvent or alone, 10–90% of a blocked aromatic isocyanate (d) relative to the weight of fluoropolymer, with both weights on a solvent-free basis;
4) adding the mixed fluoropolymer-isocyanate solvent solution to water under conditions so as to create an aqueous dispersion of the fluoropolymer-isocyanate mixture; and,
5) removing most or all of the organic solvent from the aqueous dispersion of the fluoropolymer-isocyanate mixture.

The present invention further comprises a process for preparing an oil- and water-repellent aqueous emulsion comprising steps (1) through (5) as recited above.

The present invention further comprises a method of treating fabrics or fabric blends to impart oil- and water-repellency comprising application to the surface of the fabric or fabric blend of an effective amount of the inventive aqueous emulsion as described above.

The present invention still further comprises a fabric or fabric blendwhich has been treated according to the method of the present invention as described above.

DETAILED DESCRIPTION OF THE INVENTION

In the present description trademarks are indicated by capitalization.

The present invention comprises a process for preparing an aqueous emulsion, and the resulting emulsion, useful for imparting oil- and water-repellency with high washing durability to fabrics or fabric blends, particularly to cotton fabrics or blends. By "fabrics" is meant natural or synthetic fabrics composed of fibers of cotton, rayon, silk, wool, hemp, polyester, spandex (including LYCRA), polypropylene, polyolefins, nylon, aramids, and poly (trimethylene terephthalate). By "fabric blends" is meant fabrics made of two or more types of fibers. Typically these blends are a combination of a natural fiber and a synthetic fiber, but can also include a blend of two natural fibers or two synthetic fibers. Superior oil- and water-repellency properties can be imparted to fabrics or fabric blends by the addition of certain fluorochemical copolymers. These can be applied to the fabric in the form of an emulsion or dispersion in water or other solvent either before, after or during the application of other fabric treatment chemicals.

The inventive, highly efficient copolymers useful for this purpose are characterized in that they are made by forming a monomer mixture of (a) a perfluoroalkyl compound, (b) a long-chain alkyl (meth)acrylate and (c) hydroxyethyl methacrylate or hydroxyethyl (meth)acrylamide, polymerizing the monomer mixture in an organic solvent, adding a blocked aromatic isocyanate (d) to the fluoropolymer solution, adding a water/surfactant mixture in such a way as to form an aqueous dispersion of the fluoropolymer-isocyanate mixture, and removing most or all of the organic solvent from the resulting aqueous dispersion.

In forming the above monomer mixture, the perfluoroalkyl compound (a) has the formula:

wherein
  $R_f$ is a straight or branched-chain perfluoroalkyl group containing from 2 to about 20 carbon atoms,
  R is H or $CH_3$,
  A is O, S, or N(R'),
  Q is alkylene of 1 to about 15 carbon atoms, hydroxyalkylene of 3 to about 15 carbon atoms, —$(C_nH_{2n})$$(OC_qH_{2q})_m$—, —$SO_2$—NR'$(C_nH_{2n})$—, or —CONR'$(C_nH_{2n})$—, R' is H or alkyl of 1 to about 4 carbon atoms, n is 1 to about 15, q is 2 to about 4, and m is 1 to about 15.

Preferably monomer (a) is a perfluoroalkylethyl (meth) acrylate. More preferably the perfluoroalkyl carbon chain length distribution by weight is about 50% of 8-carbon, about 29% of of 10-carbon, about 11% of 12-carbon, and with smaller percentages of 6-carbon, 14-carbon and longer chain lengths. This composition is available as ZONYL TA-N from E.I. du Pont de Nemours and Company of Wilmington, Del.

The proportion of monomer (a) is at least about 70% relative to the total weight of copolymer. If it is present in lower amounts, the oil repellency drops off to an undesirable level. The proportion of monomer (a) is less than about 90%. If it is present in higher amounts, repellency will also be adversely affected, and the cost will be prohibitively higher.

The long-chain alkyl methacrylate (b) has the formula:

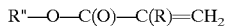

wherein R" is an alkyl group of about 12 to about 24 carbons and R is H or $CH_3$. The long-chain alkyl (meth)acrylate is added so as to constitute 5–25% of the monomer chain units on a weight basis. If the percentage is below 5%, the fluorine efficiency of the copolymer will be reduced, resulting in higher cost. If the percentage is above 25%, water and oil repellency will be inadequate. Preferably the long-chain alkyl (meth)acrylate (b) is stearyl methacrylate. These monomers can be readily prepared by conventional methods known in the art.

The hydroxyethyl methacrylate or (meth)acrylamide (c) has the formula:

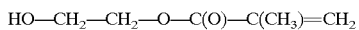

or

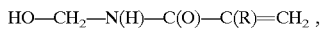

wherein R is H or $CH_3$.

This compound is added so as to constitute 0.1–2.5% of the monomer chain units on a weight basis. If the percentage is below 0.1%, durability to washing will be inadequate. If the percentage is above 2.5%, the oil and water repellency will be adversely affected. These ingredients are available by purchase from Rohm and Haas Company, Philadelphia, Pa.

The above mixture of monomers (a), (b) and (c) is then polymerized in an organic solvent such as methyl isobutyl ketone, acetone, ethyl acetate, isopropanol, or other ketones, esters and alcohols. By "organic solvent" is meant an organic compound in which the above monomer mixture is soluble to an amount of at least 10% by weight within the range of temperatures for the polymerization reaction. The solvent may also contain a slight amount of water, providing that it does not interfere with the required solubility.

The polymerization is conveniently initiated by azo initiators such as 2,2'-azobis(2,4-dimethylvaleronitrile). This and other suitable initiators are sold by E.I. du Pont de Nemours and Company, Wilmington, Del., under the name of VAZO 67, 52 and 64. Optionally, a chain transfer agent such as dodecyl mercaptan is also used in the polymerization.

In widely used processes for such fluoropolymer repellents, such polymerizations are carried out in aqueous emulsions, since the product will be sold and used in that form. Generally, the product obtained by emulsion polymerization has been regarded as superior to the product obtained by solvent polymerization in performance and ease of production. Unexpectedly it has been found that this is not true for the composition of this invention, in which a blocked isocyanate is added to the fluoropolymer. For maximum post-washing oil and water repellency of the treated fabric, we have found that it is important that the fluoropolymer be present in an organic solvent rather than an aqueous emulsion when the blocked isocyanate is added.

While not wishing to be bound by theory, it is believed that a more intimate mixing of the fluoropolymer and blocked isocyanate at the molecular level may occur because both components are soluble in the organic solvent or solvents chosen, and that this more intimate mixing leads to a more effective fabric treating composition. In contrast, when the fluoropolymer is made by emulsion polymerization, and the blocked isocyanate is then added, even the most intensive mixing may not lead to complete uniformity at the molecular level.

A blocked aromatic isocyanate (d) is then added to the solvent solution of the fluoropolymer formed by polymerization of monomers (a), (b) and (c). By "aromatic isocyanate" is meant isocyanate compounds with at least one aromatic group, such as materials based on toluene diisocyanate, diphenylmethane 4,4' diisocyanate, diphenylmethane 2,4' diisocyanate, polymethylenepolyphenyl isocyanate, 4,4' methylene bisphenol isocyanate, and derivatives thereof. The amount of blocked isocyanate is at least 10% of the weight of the total fluoropolymer (with both on a solvent-free basis). This amount is required for adequate durability of the post-washing repellency of the treated fabric or fabric blend. If the amount of blocked isocyanate is greater than 90%, there will be too small an amount of fluoropolymer to provide satisfactory initial repellency, and it may result in an overly harsh fabric feel.

Typically, the blocked isocyanate is made by reacting the chosen isocyanate or isocyanate derivative with the blocking agent in an aprotic organic solvent solution, making it convenient to add it in solution form to the fluoropolymer solution. Preferably the same organic solvent is used as for the fluoropolymerization reaction, as long as the organic solvent for the blocking process is aprotic, thus simplifying solvent recovery operations. However, it is also acceptable to isolate the blocked isocyanate from solution or otherwise prepare an isolated blocked isocyanate by methods known to those skilled in the art and add the undissolved isocyanate to the fluoropolymer solution.

"Blocked isocyanate" is used herein to mean the reaction products of an isocyanate and a blocking agent, wherein the blocking agent is removable from the isocyanate under the thermal conditions employed upon curing a fabric treated with a compound containing the blocked isocyanate group. These are frequently used to add durability to certain properties of treated fabrics. Conventional blocking agents include aryl alcohols, alkanone oximes, aryl thioles, organic active hydrogen compounds, sodium bisulfite and hydroxylamine. Preferred blocking agents are alkanone oximes (ketoximes), which can be de-blocked at a relatively low temperature such as used during a typical fabric curing process. Particularly preferred is butanone oxime.

Suitable isocyanates $A(CNO)_x$ for preparation of the blocked isocyanate are those wherein A is an aromatic compound, and x is 1, 2, 3 or 4. These include isocyanates or derivatives such as toluene diisocyanate, polymethylenepolyphenyl isocyanate, and 4,4' methylene bisphenol isocyanate, and include those aromatic isocyanates sold commercially for this purpose. Typical commercial products include products such as the adduct of toluene diisocyanate and trimethylolpropane (1,1.1 trihydroxymethyl propane (DESMODUR CB-75; available from Bayer Corp., Pittsburg, Pa.), aromatic isocyanates based on the polymethylenepolyphenylene ester of isocyanic acid, such as MONDUR MR-100 (available from Bayer Corp.), and aromatic isocyanates based on polymethylenepolyphenyl isocyanate containing 4,4' methylene bisphenol isocyanate (available from Dow Chemical Co., Midland, Mich.). Also available commercially are already-combined blocked aromatic isocyanates such as HYDROPHOBOL XAN and HYDROPHOBOL DL, (available from Ciba Specialty Chemicals, Langweid, Germany). Suitability for use in this invention may easily be determined by one skilled in the art.

The blocked isocyanate and fluoropolymer are then mixed as a solution. This is done most readily if the separately-made blocked isocyanate and fluoropolymer use the same organic solvent, and their solutions are simply mixed together. The mixing may be done at any convenient temperature below the point where the blocking agent starts to volatilize or undergo significant deblocking.

It is important that the blocked isocyanate and fluoropolymer be combined in an organic solvent or solvents. Samples where the blocked isocyanate and fluoropolymer are dispersed in water separately and then combined show inferior initial and post-washing repellencies.

The mixed isocyanate-fluoropolymer solvent solution is then added to water and an effective amount of surfactant or surfactants with sufficient agitation so as to create an aqueous dispersion of fluoropolymer and isocyanate. The various methods for carrying out this step are well known to those familiar with the art. Preferred surfactants are cationic or nonionic. Examples of suitable cationic dispersants are quaternary ammonium- and pyridinium salts such as stearyldimethylbenzylammonium chloride. An example of a suitable nonionic surfactant is MERPOL SE, available from Stepan Co., Northfield, Ill.

Next the solvent is removed from the aqueous dispersion of fluoropolymer and blocked isocyanate by a means such as distillation or thin layer evaporation. If desired the solvent is returned to the process as recycled material. The solvent is removed, for example, at elevated temperature (40–90° C.) in vacuo. In principle it is possible to leave a fairly large proportion of solvent present in the dispersions. However, for reasons of work safety and industrial hygiene the solvent is preferentially distilled off to such an extent that the flash points of the dispersions are above 100° C. After removal of the solvent the aqueous dispersions are stable.

The present invention further comprises a method of treating fabrics or fabric blends comprising application to the surface of the fabric or fabric blend of an effective amount of the fluoropolymer-isocyanate aqueous emulsion. The emulsion is applied to the fabric or fabric blend to be treated, either alone or in a mixture with other textile treatment agents or finishes. The emulsion is applied in an amount to provide a fluorine content on the fabric of from about 0.5% to about 5.0% by weight. The emulsion is generally applied to textile fabrics by spraying, dipping, padding, or other well-known methods. After excess liquid has been removed, for example by squeeze rolls, the treated fabric is dried and then cured by heating, for example, at from 100° to 1900° C., for at least 30 seconds, typically 60–180 seconds. Such curing enhances durability of the repellent finish. While these curing conditions are typical, some commercial apparatus may operate outside these ranges because of its specific design features.

The present invention further comprises a fabric or fabric blend which has been treated to impart oil- and water-repellent properties thereto by application of an effective amount of a copolymer-isocyanate mixture as described above. The treated fabric has a fluorine content of from about 0.5% to about 5.0% by weight. The treated fabric has superior oil- and water-repellencies, especially in terms of durability after washing.

The fluoropolymers and method of the present invention are useful to create an oil- and water-repellency durability that is highly durable even after multiple launderings. The improvement in durability is especially evident for fabrics treated with permanent press resins. The treated fabrics and fabric blends of the present invention are useful for a variety of applications such as textiles, clothing, furnishings and the like. The fluoropolymer ingredients of the present invention are advantageous in that they are safer to manufacture than the urethane type fluoropolymer, and are made at lower materials cost than urethane-based fluoropolymers, in part because the gas/liquid reactions required for manufacturing phosgene and intermediate isocyanate fluorochemicals are eliminated. The invented compositions thus provide a higher degree of durable oil and water repellency to treated fabrics at lower cost. In addition, the treated fabrics of this invention can regain repellency properties after laundering by simply tumble drying or brief pressing.

PERFORMANCE EVALUATION

The above dispersions were tested for repellency performance by first padding on tan 100% cotton fabric, using a defined amount of fluorochemical treatment agent along with PERMAFRESH MSC, a permanent press resin available from Sequa Chemicals Inc, Chester, S.C., and cured at 330° C. for two minutes. The treated fabrics were repeatedly laundered and dried by the standardized procedure described below before testing for oil and water repellency.

Laundering Procedure

The fabric samples were laundered according to the U.S. Home Laundering Method outlined in the TEFLON Global Specifications and Quality Control Tests information packet. Fabric samples are loaded into a KENMORE automatic washer with a ballast load to give a total dry load of 4 lb. A commercial detergent is added (AATCC 1993 Standard Reference Detergent WOB) and the washer is filled to a high water level with warm water (105° F.)(41° C.). The samples and ballast are washed a designated number of times (5HW=5 washes, 10HW=10 washes, etc.) using a 12-minute normal wash cycle followed by rinse and spin cycles. The samples are not dried between wash cycles.

After washing is complete, the wet fabric samples and ballast are transferred to a KENMORE automatic dryer and dried for 45 minutes at the high/cotton setting to achieve a vent temperature of 155–160° F. (68–71° C.).

Water Repellency

The water repellency of a treated fabric was measured by determining the resistance of the fabric by wetting with various aqueous liquids. The test is outlined in the TEFLON Global Specifications and Quality Control Test information packet, available from E.I. du Pont de Nemours and Company. Drops of water/alcohol mixtures of various surface tensions were placed on the treated fabric and the extent of surface wetting determined visually. The ratings correspond to the numbers given to the water/alcohol mixtures as shown in the table below. The numbers are assigned such that the higher the rating, the better the resistance of the fabric to more penetrating water/alcohol blends. This test of water/alcohol repellency also provides a rough index of the aqueous stain resistance of the fabric. The test water/alcohol mixtures and their numbers are shown in the following table.

| Standard Test Liquids | | |
|---|---|---|
| Water/alcohol Repellency | Composition, Volume % | |
| Rating Number | Isopropyl Alcohol | Distilled Water |
| 1 | 2 | 98 |
| 2 | 5 | 95 |
| 3 | 10 | 90 |
| 4 | 20 | 80 |
| 5 | 30 | 70 |
| 6 | 40 | 60 |

Spray Rating

The spray rating of a fabric is a value showing the repellency of the fabric to a water spray. The treated fabric samples were tested for their spray rating using AATCC standard Test Method No. 22 of the American Association of Textile Chemists and Colorists. In this test, 250 mL of water at 27° C. is poured on a fabric sample stretched on a 6 inch (15.2 cm) diameter metal hoop. The water is discharged from a funnel suspended 6 inches (15.2 cm) above the fabric sample. After removal of excess water, the fabric is visually scored by reference to published standards. A rating of 100 denotes no water penetration or surface adhesion; a rating of 90 denotes slight random sticking or wetting; lower values denote greater wetting.

Oil Repellency

The treated fabric samples were tested for oil repellency by a modification of AATCC standard Test Method No. 118, conducted as follows. A fabric sample, treated with an aqueous dispersion of polymer as previously described, is conditioned for a minimum of 2 hours at 23° C. at 20 % relative humidity and 65° C. at 10% relative humidity. A series of organic liquids, identified below in Table I, are then applied dropwise to the fabric samples. Beginning with the lowest numbered test liquid (Repellency Rating No. 1), one drop (approximately 5 mm in diameter or 0.05 mL volume) is placed on each of three locations at least 5 mm apart. The drops are observed for 30 seconds. If, at of the three drops are still spherical in shape with no wicking around the drops, three drops of the next highest numbered liquid are placed on adjacent sites and similarly observed for 30 seconds. The procedure is continued until one of the test liquids results in two of the three drops failing to remain spherical to hemispherical, or wetting or wicking occurs.

The oil repellency rating of the fabric is the highest numbered test liquid for which two of the three drops remained spherical to hemispherical, with no wicking for 30 seconds. In general, treated fabrics with a rating of 5 or more are considered good to excellent; fabrics having a rating of one or greater can be used in certain applications.

| Standard Test Liquids | |
|---|---|
| AATCC Oil Repellency Rating Number | Compositions |
| 1 | NUJOL mineral oil |
| 2 | NUJOL/n-hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Note: NUJOL is a trademark of Plough, Inc., for a mineral oil having a Saybolt viscosity of 360/390 at 38° C. and a specific gravity of 0.880/0.900 at 15° C.

EXAMPLES

The following examples are intended to illustrate the methods and benefits of carrying out this invention, and are not to be interpreted as limiting.

Example 1

1A) Preparation of Fluoropolymer Component in Solvent

A 2000 ml four-neck round-bottom flask fitted with a water cooled condenser, a thermocouple, and agitator was charged with ZONYL TA-N (279.4 g), a perfluoroalkylethyl acrylate having the formula: $CF_3CF_2(CF_2)_xC_2H_4OC(O)-C(H)=CH_2$, wherein x=4, 6, 8, 10, 12, 14, and 16 in the approximate respective relative amounts of about 3%, 50%, 31%, 10%, 3% 2% and 1%, said monomer having a weight average molecular weight of approximately 569, available from E.I. du Pont de Nemours and Company, Wilmington, Del.; stearyl methacrylate (73.3 g); N-methylol acrylamide (MAM, 4.0 g); 2-hydroxyethyl methacrylate (HEMA, 2.1 g); dodecyl mercaptan (DDM, 1.0 g); and methylisobutyl ketone (MIBK, 500 g). Dry deoxygenated nitrogen was passed through the solution for 30 minutes. A solution of the azo free-radical initiator VAZO 67, available from E.I. du Pont de Nemours and Company, Wilmington, Del. (3.3 g) in MIBK (40.0 g) was added, and the reaction mixture was heated to 70° C. for 10 hours. The resulting solution polymer contained 35.3% solids.

1B) Preparation of Blocked Isocyanate in Solvent

DESMODUR CB-75N, a toluene diisocyanate trimethylolpropane prepolymer available from Bayer Corporation, Pittsburgh, Pa. (200.0 g) and dry MIBK (300.0 g) were added to a 1000 mL flask fitted with a condenser, addition funnel, thermocouple, and agitator. A solution of 2-butanone oxime (59.2 g) in MIBK (30.0 g) was cautiously added to the stirred reaction mass over approximately 1 hour and the reaction mixture was heated to 70° C. for 15 minutes. The resulting material contained 38.5% solids.

1C) Preparation of aqueous emulsion from solvent solutions:

Water at 70° C. (415.4 g), cationic surfactant MARLOWET 5401, a poly(oxy-1,2-ethanediyl), alpha-[2-[[3-(dodecyloxy)propyl]amino]ethyl]-omega-hydroxy-, acetate salt obtained from Huls AG, Piscataway N.J. (11.3 g) and propylene glycol (15.9 g) were combined in a beaker. The pH was adjusted to 3.0 with 10% hydrochloric acid solution. The fluoropolymer solution from (1A) above (190.4 g) and the blocked isocyanate solution from (1B) above (114.3 g) were combined in a separate beaker and poured with stirring into the water/surfactant mixture at 70° C. The solution was maintained at 70° C. and passed through a microfluidizer two times at 6,000 psi ($41.37 \times 10^6$ Pa) and was then distilled under reduced pressure to remove the MIBK. The resulting milky emulsion contained 21.7 % solids.

1D) Application Test

The sample produced from Example 1C was applied to 100% royal blue cotton twill fabric by a conventional squeeze roller method. For comparison, competitive example treatments were applied to uniformly provide a concentration of approximately 1200 parts per million (micrograms/gram) fluorine on fabric. The padded fabric was dried and cured at 330° C. for two minutes. The fabric was tested for repellency according to the performance evaluation tests previously described. Results are shown in Table 1 below.

Example 2

2A) Preparation of Fluoropolymer Component in Solvent

The following monomer combination was polymerized according to the procedure described in Example 1:ZONYL TA-N (279.4 g), stearyl methacrylate (73.3 g), 2-hydroxyethyl methacrylate (HEMA, 2.1 g), dodecyl mercaptan (DDM, 1.0 g), methylisobutyl ketone (MIBK, 500 g) and VAZO 67 (3.3 g) in MIBK (40.0 g). The resulting solution polymer contained 32.1% solids.

2B) Preparation of Blocked Isocyanate in Solvent

This was prepared as in Example 1B.

2C) Preparation of Aqueous Emulsion from Solvent Solutions

The fluoropolymer solution from Example 2A above (190.4 g) and the blocked isocyanate from Example 2B above (114.3 g) were mixed together and dispersed in water (415.4 g) and propylene glycol (15.9 g) using MARLOWET 5401 (11.3 g) as described in Example 1C. The resulting milky emulsion contained 26.3% solids.

2D) Application Test

The emulsion from Example 2C was tested as in Example 1D. As a comparison, OLFOPHOBOL FMX, a perfluoroalkylacrylate copolymer emulsion combined with a proprietary blocked isocyanate emulsion, available from Ciba Specialty Chemicals, Langweid, Germany, was also applied at an amount that provided an equal level of fluorine on the fabric. The fabric was tested according to the performance evaluation tests previously described. Results are shown in Table 1 below.

TABLE 1

| Example | Oil Repellency | | | Water Repellency | | | Spray rating | | |
|---|---|---|---|---|---|---|---|---|---|
| | Initial | 5 HW | 10 HW | Initial | 5 HW | 10 HW | Initial | 5 HW | 10 HW |
| Example 1 | 6 | 4 | 3 | 5 | 4 | 4 | 100 | 80 | 70 |
| Example 2 | 6 | 5 | 5 | 5 | 6 | 5 | 100 | 90 | 80 |
| OLEOPHOB. FMX | 6 | 2 | 0 | 5 | 4 | 3 | 100 | 70 | 70 |

As can be seen from Table 1, both Examples 1 and 2 had more durable oil and water repellency and spray rating than commercial product OLEOPHOBOL FMX. Example 2 clearly had the best combination of durable oil and water repellency and spray rating in the group.

Comparative Example A

A) Preparation of Fluoropolymer Component in Emulsion

A fluoropolymer with the exact monomer ratio as in Example 2 was prepared by emulsion polymerization as follows. Water heated to 70° C. (700.0 g), the cationic surfactant MARLOWET 5401 (17.8 g), ZONYL TA-N (139.7 g), stearyl methacrylate (36.7 g), 2-hydroxyethyl methacrylate (HEMA, 1.1 g), and dodecyl mercaptan (DDM, 1.0 g) were combined in a blender. The resulting emulsion was passed through a microfluidizer two times at 6,000 psi ($41.37 \times 10^6$ Pa). The emulsion solution was transferred to a 1000 mL flask fitted with heating mantle, condenser, thermocouple, agitator, and nitrogen inlet. The solution was sparged with nitrogen until cooled to room temperature. A solution of the initiator V-50 (0.5 g) in water (10.0 g) was added and the reaction mixture was heated to 65° C. for 8 hours. The resulting emulsion had 19.7% solids.

B) Preparation of Blocked Isocyanate in Emulsion

The blocked isocyanate solution (DESMODUR CB-75, a toluene diisocyanate trimethylolpropane prepolymer and 2-butanone oxime) described in Example 1B above was dispersed as follows: Water at 70° C. (415.4 g), MARLOWET 5401 (11.3 g) and propylene glycol (15.9 g) were combined in a beaker. The pH was adjusted to 3.0 with 10% hydrochloric acid solution. The blocked isocyanate solution (285.0 g) was poured with stirring into the water/surfactant mixture at 70° C. The solution was maintained at 70° C. and passed through a microfluidizer two times at 6,000 psi ($41.37 \times 10^6$ Pa) and was then distilled under reduced pressure to remove the MIBK. The resulting milky emulsion was 27.7 % solids.

C) Preparation of Combined Aqueous Emulsion

The blocked isocyanate dispersion described in B above was combined with the emulsion fluoropolymer from A above in proportions that gave a composition identical to that of Example 2.

D) Application Test

The sample from C above was applied to 100 % tan cotton twill fabric by conventional squeeze roller method. Treatments were applied to uniformly provide a concentration of approximately 1200 PPM fluorine on fabric. The padded fabric was dried and cured at 330° C. for two minutes. The permanent press resin PERMAFRESH MSC, available from Sequa Chemicals Inc, Chester, S.C. was added to the fluorochemical pad baths at the equivalent of 80 g/L. The fabric was tested in accordance with the performance evaluation tests previously described. Results are shown in Table 2 below.

Comparative Example B

A) Preparation of Fluoropolymer Component in Emulsion

The fluoropolymer solution described in Example 2 was dispersed as follows: Water at 70° C. (415.4 g), MARLOWET 5401 (11.3 g) and propylene glycol (15.9 g) were combined in a beaker. The pH was adjusted to 3.0 with 10% hydrochloric acid solution. The fluoropolymer solution (241.9 g) was poured with stirring into the water/surfactant mixture at 70° C. The solution was maintained at 70° C. and passed through a microfluidizer two times at 6,000 psi ($41.37 \times 10^6$ Pa) and was then distilled under reduced pressure to remove the MIBK. The resulting milky emulsion was 25.1 % solids.

B) Preparation of Blocked Isocyanate in Emulsion

This was prepared as in Comparative Example A, step B.

C) Mixing of emulsions

The dispersion of the fluoropolymer solution from A above was combined with the DESMODUR CB-75 blocked isocyanate dispersion from B above in proportions that gave a composition identical to that of Example 2.

D) Application Test

The sample from C above was applied to a fabric using the procedure of Comparative Example A, step C, and the fabric tested in accordance with the performance evaluation tests previously described, as was Example 2 and OLEOPHOBOL FMX. Results are shown in Table 2 below.

TABLE 2

| | Oil Repellency | | | Water Repellency | | | Spray rating | | |
|---|---|---|---|---|---|---|---|---|---|
| Example | Initial | 5 HW | 10 HW | Initial | 5 HW | 10 HW | Initial | 5 HW | 10 HW |
| Example 2 | 6 | 6 | 6 | 6 | 7 | 7 | 100 | 100 | 100 |
| Comp. Ex. A | 6 | 3 | 3 | 6 | 6 | 5 | 100 | 100 | 90 |
| Comp. Ex. B | 6 | 5 | 5 | 6 | 6 | 6 | 100 | 100 | 100 |
| OLBOPHOB. FMX | 5 | 3 | 2 | 6 | 6 | 5 | 100 | 90 | 90 |

The performance data in this table clearly shows that Example 2, in which the fluoropolymer and isocyanate are mixed as solutions, was superior in oil, water, and water repellency initially and after repeated laundering, when compared to compositions where the fluoropolymer and isocyanate are mixed as emulsions.

In the following set of performance evaluation tests, the compositions of the present invention are again tested in a cotton fabric that has been treated with a permanent press resin, but in this case the respective Examples of Table 2 were applied at 900 micrograms/gram fluorine. Again, the equivalent of 80 g/L of Permafresh MSC was added to provide permanent press. In the column headed "5HWP", after 5 washes a fabric sample was pressed for 1 minute to demonstrate the difference in repellency from no press to press treatment.

TABLE 3

| Example | Oil Repellency | | | Water Repellency | | | Spray rating | | |
| --- | --- | --- | --- | --- | --- | --- | --- | --- | --- |
| | Initial | 5 HW | 5 HWP | Initial | 5 HW | 5 HWP | Initial | 5 HW | 5 HWP |
| Example 2 | 6 | 5 | 5 | 6 | 6 | 6 | 100 | 100 | 100 |
| Comp. Ex. A | 5 | 2 | 3 | 5 | 5 | 5 | 100 | 80 | 90 |
| Comp. Ex. B | 5 | 4 | 5 | 6 | 6 | 6 | 100 | 100 | 100 |
| Oleophob. FMX | 5 | 2 | 3 | 6 | 5 | 6 | 90 | 80 | 90 |

As can be seen, Example 2 again showed the best overall repellency initially and after laundering. Example 2 did not require pressing for optimum performance, i.e., its repellency was the same before and after pressing. The comparative examples generally showed a slight improvement on pressing after 5 wash cycles, particularly in the oil repellency, but even after pressing their results were no better than for Example 2 without the need for pressing.

The following examples show the applicability of this invention to various blocked isocyanates:

Comparative Example C

DESMODUR N-100, an aliphatic polyisocyanate available from Bayer Corporation, Pittsburgh, Pa. (200.0 g) and dry MIBK (220.0 g) were added to a 1000 mL flask fitted with a condenser, addition funnel, thermocouple, and agitator. A solution of 2-butanone oxime (63.3 g) in MIBK (30.0 g) was cautiously added to the stirred reaction mass over about 1 hour and the reaction mixture was heated to 70° C. for 15 minutes. The resulting material had 34.3% solids.

The resulting blocked isocyanate solution was mixed with the fluoropolymer solution of Example 2, and an aqueous emulsion formed as in Example 2C. The emulsion was applied to tan 100 % cotton twill fabric by conventional squeeze roller method as previously described. Treatments were applied to uniformly provide a concentration of approximately 1200 PPM fluorine on fabric. The padded fabric was dried and cured at 330° C. for two minutes. The fabric was tested in accordance with the performance evaluation tests as previously described.

Example 3

MONDUR 489, an aromatic isocyanate available from Bayer Corporation (150.0 g) and dry MIBK (300.0 g) were added to a 1000 mL flask fitted with a condenser, addition funnel, thermocouple, and agitator. A solution of 2-butanone oxime (104.6 g) in MIBK (30.0 g) was cautiously added to the stirred reaction mass over about 1 hour and the reaction mixture was heated to 70° C. for 15 minutes. The resulting material had 45.6 % solids. It was mixed with fluoropolymer, converted to the inventive composition and tested as in Comparative Example C Example 4

MONDUR MR-200, an aromatic isocyanate based on isocyanic acid, polymethylenepolyphenylene ester, available from Bayer Corporation (150.0 g), and dry MIBK (300.0 g) were added to a 1000 mL flask fitted with a condenser, addition funnel, thermocouple, and agitator. A solution of 2-butanone oxime (103.2 g) in MIBK (30.0 g) was cautiously added to the stirred reaction mass over about 1 hour and the reaction mixture was heated to 70° C. for 15 minutes. The resulting material had 47.2 % solids. It was mixed with a solution of fluoropolymer, converted to the inventive composition and tested as in Comparative Example C.

Example 5

PAPI 2027, an aromatic isocyanate based on polymethylene polyphenyl isocyanate containing 4,4' methylene bisphenyl isocyanate available from the Dow Chemical Company, Midland, Mich. (150.0 g) and dry MIBK (300.0 g) were added to a 1000 mL flask fitted with a condenser, addition funnel, thermocouple, and agitator. A solution of 2-butanone oxime (107.3 g) in MIBK (30.0 g) was cautiously added to the stirred reaction mass over about 1 hour and the reaction mixture was heated to 70° C. for 15 minutes. The resulting material had 45.1 % solids. It was mixed with a solution of fluoropolymer, converted to the inventive composition and tested as in Comparative Example C.

Comparative Example D

HYDROPHOBOL XAN (believed to be a dispersion of 2-butanone oxime blocked aromatic isocyanates), obtained from Ciba Specialty Chemicals, Langweid, Germany, was mixed with the solution of fluoropolymer of Example 2 in a 1:1 weight ratio of solids, and tested as in Comparative Example C.

Comparative Example E

HYDROPHOBOL DL (also believed to be a dispersion of 2-butanone oxime blocked aromatic isocyanates), obtained from Ciba Specialty Chemicals was mixed with the fluoropolymer of Example 2 in a 1:1 weight ratio of solids, by simply blending the aqueous emulsions, and tested as in Comparative Example C.

Comparative Example F

REPEARL MF (believed to be a dispersion of a oxime blocked isocyanate), available from Mitsubishi International Corporation, New York, N.Y., was mixed with the fluoropolymer of Example 2 in a 1:1 weight ratio of solids by simply blending the aqueous emulsions, and tested as in Comparative Example C.

TABLE 4

| Example | Oil Repellency | | | Water Repellency | | | Spray rating | | |
|---|---|---|---|---|---|---|---|---|---|
| | Initial | 5 HW | 10 HW | Initial | 5 HW | 10 HW | Initial | 5 HW | 10 HW |
| Example 2 | 6 | 6 | 6 | 6 | 7 | 7 | 100 | 100 | 100 |
| Comp. Ex. C | 6 | 4 | 2 | 6 | 7 | 5 | 90 | 80 | 50 |
| Example 3 | 6 | 6 | 6 | 7 | 8 | 7 | 100 | 100 | 90 |
| Example 4 | 6 | 6 | 6 | 7 | 8 | 8 | 100 | 100 | 90 |
| Example 5 | 6 | 6 | 6 | 7 | 8 | 8 | 100 | 100 | 90 |
| Comp. Ex. D | 6 | 5 | — | 6 | 7 | — | 100 | 90 | — |
| Comp. Ex. E | 6 | 5 | — | 6 | 6 | — | 100 | 90 | — |
| Comp. Ex. F | 6 | 5 | 4 | 5 | 7 | 6 | 90 | 90 | 90 |
| Oleophob. C | 6 | 6 | 6 | 6 | 6 | 5 | 100 | 90 | 80 |
| Oleophob. FMX | 6 | 5 | 4 | 7 | 7 | 6 | 100 | 90 | 80 |

Again, the present invention (Examples 2, 3, 4, 5) outperform Comparative Examples C, D, E and F (Example C is an aliphatic blocked isocyanate; Examples D, E and F use commercially available isocyanates that were blocked with butanone oxime and then mixed with the fluopolymer as dispersions), and competitive samples (OLEOPHOBOL C, OLEOPHOBOL FMX) for both initial performance and durability of performance to laundering.

Examples 6–12, Comparative Example G

The following fluorochemical copolymers were prepared according to the procedure of Example 1A, with the weight% summarized in Table 5 below. "FLUORAD" FX-14, (2-(N)-ethylperfluorooctane sulfonamide), is available from Minnesota Mining and Manufacturing Co., Minneapolis, Minn.

The fluoropolymers described in each of Examples 6–12 and Comparative Example G above were combined with the blocked isocyanate solution in Example 1 B in a 1:1 solids ratio and these were designated Examples 6 to 12 and Comparative Examples G, corresponding to 6 to 12 and G, respectively, in Table 5.

The compositions from Examples 6 to 12 and Comparative Example G were applied to tan 100 % cotton twill fabric by the conventional squeeze roller method as previously described. Treatments were applied to uniformly provide a concentration of approximately 1800 micrograms/gram fluorine on fabric. The padded fabric was dried and cured at 330° C. for two minutes and tested according to the methods previously described. The fabric was tested in accordance with the performance evaluation tests previously described.

TABLE 5

| Example | ZONYL TA-N | FX-14 | Stearyl Methacr* | Lauryl Methacr* | N-Methylol Acrylamide | Hydroxyethyl Methacr* |
|---|---|---|---|---|---|---|
| Example 6 | 90 | — | 9 | — | — | 1 |
| Example 7 | 70 | — | 29 | — | — | 1 |
| Example 8 | 78 | — | 19 | — | — | 3 |
| Example 9 | 78 | — | 19 | — | 1.5 | 1.5 |
| Example 10 | 79 | — | — | 20 | — | 1 |
| Example 11 | 79 | — | 10 | 10 | — | 1 |
| Example 12 | 90 | — | — | 9 | — | 1 |
| Comp. Ex. G | — | 79 | 20.3 | — | — | 0.7 |

*Methacr is used to mean methacrylate.

TABLE 6

| Example | Oil Repellency | | | Water Repellency | | | Spray rating | | |
|---|---|---|---|---|---|---|---|---|---|
| | Initial | 5 HW | 10 HW | Initial | 5 HW | 10 HW | Initial | 5 HW | 10 HW |
| Example 6 | 6 | 5 | 5 | 6 | 8 | 8 | 100 | 100 | 90 |
| Example 7 | 6 | 5 | 5 | 6 | 8 | 8 | 100 | 100 | 90 |
| Example 8 | 6 | 5 | 5 | 6 | 8 | 7 | 100 | 100 | 90 |
| Example 9 | 5 | 4 | 3 | 5 | 5 | 5 | 90 | 90 | 80 |
| Example 10 | 6 | 6 | 6 | 7 | 8 | 8 | 100 | 100 | 100 |
| Example 11 | 6 | 6 | 5 | 6 | 8 | 8 | 100 | 100 | 90 |
| Example 12 | 5 | 4 | 4 | 5 | 6 | 5 | 100 | 90 | 80 |
| Comp. Ex. G | 2 | — | — | 4 | — | — | 70 | — | — |
| Oleophob. C | 6 | 6 | 6 | 6 | 6 | 5 | 100 | 90 | 80 |
| Oleophob. FMX | 6 | 5 | 4 | 7 | 5 | 4 | 100 | 90 | 80 |

Examples 6, 7 and 8 have a fluoropolymer with the same monomer composition but in different ratios than the fluoropolymer in Example 2A. All showed excellent performance compared to the competitive samples.

Example 9 showed a lower level of performance for a fluoropolymer with a relatively high weight % of the component monomer (c): i.e., 3% total combined of n-methyol acryamide (MAM) and 2-hydroxyethyl methacrylate (HEMA). This defined the upper limit of monomer (c).

Example 10 showed the utility of a hydrocarbon monomer other than stearyl methacrylate, with excellent performance. Example 11 showed that a combination of two hydrocarbon monomers can be used effectively, with excellent performance.

Example 12 showed that the range of composition of fluoropolymer containing lauryl methacrylate was as broad as the range of composition of fluoropolymer containing stearyl methacrylate.

Comparative Example G showed that the performance of FLUORO FX-14 in the application has poorer performance than the preferred ZONYL TA-N.

What is claimed is:

1. An aqueous emulsion prepared by
1) forming a monomer mixture comprising by weight:
   (a) 70–90% polymer chain units derived from a mixture of monomers of the formula:

$$R_f\text{—}Q\text{—}A\text{—}C(O)\text{—}C(R)\text{=}CH_2$$

wherein
   $R_f$ is a straight or branched-chain perfluoroalkyl group containing from 2 to about 20 carbon atoms,
   R is H or $CH_3$,
   A is O, S, or N(R'),
   Q is alkylene of 1 to 15 carbon atoms, hydroxyalkylene of 3 to 15 carbon atoms, —$(C_nH_{2n})(OC_qH_{2q})_m$—, —$SO_2$—$NR'(C_nH_{2n})$—, or —$CONR'(C_nH_{2n})$—, wherein R' is H or alkyl of 1 to about 4 carbon atoms, n is 1 to about 15, q is 2 to about 4, and m is 1 to about 15;
   (b) 5–25% monomer chain units derived from a long-chain alkyl (meth)acrylate of the formula:

$$R''\text{—}O\text{—}C(O)\text{—}C(R)\text{=}CH_2$$

wherein R'' is an alkyl group of about 12 to about 24 carbons and R is H or $CH_3$;
   (c) 0.1–2.5% monomer chain units derived from compounds of the formulas $$HO\text{—}CH_2\text{—}CH_2\text{—}O\text{—}C(O)\text{—}C(R)\text{=}CH_2$$

or $$HO\text{—}CH_2\text{—}N(H)\text{—}C(O)\text{—}C(R)\text{=}CH_2,$$

wherein R is H or $CH_3$;
2) polymerizing the mixture of monomers (a), (b) and (c) in an organic solvent using a free radical initiator to yield a fluoropolymer;
3) adding in an organic solvent or alone, 10–90% of an aromatic blocked isocyanate relative to the weight of fluoropolymer, with both weights on a solvent-free basis, to yield a mixed fluoropolymer-isocyanate solvent solution;
4) adding the mixed fluoropolymer-isocyanate solvent solution to water to create an aqueous dispersion of the mixed fluoropolymer-isocyanate solvent solution; and,
5) removing most or all of the organic solvent from the aqueous dispersion of the mixed fluoropolymer-isocyanate solvent solution.

2. The emulsion of claim 1 wherein A is O and Q is an alkylene.

3. The emulsion of claim 1 wherein the monomer mixture comprises perfluoroalkylethyl(meth)acrylate, stearyl methacrylate, and 2-hydroxyethyl methacrylate.

4. The emulsion of claim 1 wherein the mixture of monomers of formula $R_f$—Q—A—C(O)—C(R)=$CH_2$ is a mixture of the formula $CF_3CF_2(CF_2)_xC_2H_4OC(O)$—C(H)=$CH_2$ wherein x is 4, 6, 8, 10, 12, 14 and 16.

5. A process for preparing an oil- and water-repellent aqueous emulsion comprising:
forming a monomer mixture comprising by weight:
   (a) 70–90% polymer chain units derived from a mixture of monomers of the formula:

$$R_f\text{—}Q\text{—}A\text{—}C(O)\text{—}C(R)\text{=}CH_2$$

wherein
   $R_f$ is a straight or branched-chain perfluoroalkyl group containing from 2 to about 20 carbon atoms,
   R is H or $CH_3$,
   A is O, S, or N(R'),
   Q is alkylene of 1 to 15 carbon atoms, hydroxyalkylene of 3 to 15 carbon atoms, —$(C_nH_{2n})(OC_qH_{2q})_m$—, —$SO_2$—$NR'(C_nH_{2n})$—, or —$CONR'(C_nH_{2n})$—, wherein R' is H or alkyl of 1 to about 4 carbon atoms, n is 1 to about 15, q is 2 to about 4, and m is 1 to about 15;
   (b) 5–25% monomer chain units derived from a long-chain alkyl (meth)acrylate of the formula:

$$R''\text{—}O\text{—}C(O)\text{—}C(R)\text{=}CH_2$$

wherein R'' is an alkyl group of about 12 to about 24 carbons and R is H or $CH_3$;
   c) 0.1–2.5% monomer chain units derived from compounds of the formulas $$HO\text{—}CH_2\text{—}CH_2\text{—}O\text{—}C(O)\text{—}C(R)\text{=}CH_2$$

or $$HO\text{—}CH_2\text{—}N(H)\text{—}C(O)\text{—}C(R)\text{=}CH_2,$$

wherein R is H or $CH_3$;
2) polymerizing the mixture of monomers (a), (b) and (c) in an organic solvent using a free radical initiator to yield a fluoropolymer;
3) adding in an organic solvent or alone, 10–90% of an aromatic blocked isocyanate relative to the weight of fluoropolymer, with both weights on a solvent-free basis, to yield a mixed fluoropolymer-isocyanate solvent solution;
4) adding the mixed fluoropolymer-isocyanate solvent solution to water to create an aqueous dispersion of the mixed fluoropolymer-isocyanate solvent solution; and,
5) removing most or all of the organic solvent from the aqueous dispersion of the mixed fluoropolymer-isocyanate solvent solution.

6. The process of claim 5 wherein A is O and Q is an alkylene.

7. The process of claim 5 wherein the monomer mixture comprises perfluoroalkylethyl(meth)acrylate, stearyl methacrylate, and 2-hydroxyethyl methacrylate.

8. The process of claim 5 wherein the mixtures of monomers of formula $R_f$—Q—A—C(O)—C(R)=$CH_2$ is a mixture of the formula $CF_3CF_2(CF_2)_xC_2H_4OC(O)-C(H)=CH_2$ wherein x is 4,6,8,10,12,14 and 16.

9. A method of treating fabric or fabric blend to impart oil- and water-repellency comprising application to the surface of the fabric or fabric blend of an aqueous dispersion of claim 1 or 2.

10. A fabric or fabric blend having applied to its surface an aqueous dispersion of claim 1 or 2.

11. The fabric or fabric blend of claim 10 having a fluorine content of from about 0.5% to about 5.0% by weight.

12. The fabric or fabric blend of claim 10 comprising cotton, rayon, silk, wool, hemp, polyester, spandex, polypropolylene, polyolefm, nylon, aramid, and poly (trimethylene terephthalate).

* * * * *